United States Patent
Suzuki et al.

(10) Patent No.: US 6,613,223 B2
(45) Date of Patent: Sep. 2, 2003

(54) GARBAGE TREATMENT APPARATUS

(76) Inventors: Mitsuru Suzuki, 13-7, Kitaterao 1-chome, Turumi-ku, Yokohama City, Kanagawa (JP), 230-0074; Yukio Araki, 21-4, Nakai, Hannou City, Saitama (JP), 357-0002

( * ) Notice: Subject to any disclaimer, the term of this patent is extended or adjusted under 35 U.S.C. 154(b) by 44 days.

(21) Appl. No.: 10/050,137

(22) Filed: Jan. 18, 2002

(65) Prior Publication Data
US 2002/0096459 A1 Jul. 25, 2002

(30) Foreign Application Priority Data
Jan. 19, 2001 (JP) .................................... 2001-012280

(51) Int. Cl.[7] .............................. C02F 3/00; C05F 9/02
(52) U.S. Cl. ................. 210/150; 210/173; 210/179; 210/194; 210/219; 71/8; 71/14; 435/290.2
(58) Field of Search ............................ 210/150, 181, 210/173, 179, 209, 219, 617, 194; 71/8, 9, 10, 14; 435/290.2

(56) References Cited

U.S. PATENT DOCUMENTS

| | | | |
|---|---|---|---|
| 2,474,833 A | * | 7/1949 | Eweson .................... 71/9 |
| 3,314,765 A | * | 4/1967 | Abson et al. ................ 71/9 |
| 3,853,480 A | * | 12/1974 | Kaelin ...................... 71/9 |
| 4,062,770 A | * | 12/1977 | Kneer ..................... 210/151 |
| 4,169,878 A | * | 10/1979 | Etherington ............. 435/290.2 |
| 4,249,929 A | * | 2/1981 | Kneer ...................... 71/9 |
| 4,758,344 A | * | 7/1988 | Wildenauer ................ 71/14 |
| 4,882,058 A | * | 11/1989 | Burton ................... 210/150 |
| 5,234,596 A | * | 8/1993 | Greeb ...................... 71/9 |
| 5,277,814 A | * | 1/1994 | Winter et al. ............. 210/618 |
| 5,480,538 A | * | 1/1996 | McCombs et al. .......... 210/151 |
| 5,494,574 A | * | 2/1996 | Unterman et al. .......... 210/150 |

FOREIGN PATENT DOCUMENTS

| | | |
|---|---|---|
| GB | 2 286 825 A | 2/1995 |
| JP | 8-242856 | 3/1995 |
| JP | 9-253617 | 3/1996 |

* cited by examiner

Primary Examiner—Christopher Upton

(57) ABSTRACT

A garbage treatment apparatus of the type which includes a cylindrical container formed to store an amount of porous inorganic balls containing microorganism effective for decomposition of garbage and to store an amount of garbage to be treated, a rotation shaft vertically mounted for rotary movement in a central portion of the container, a driving mechanism mounted on the container for driving the rotation shaft, a screw propeller assembly mounted to a lower portion of the rotation shaft for rotation therewith to feed downward the inorganic balls and garbage stored in the container, a flow adjustment plate in the form of a truncated conical plate mounted within a bottom portion of the container concentrically with the rotation shaft and placed in an upwardly expanded condition, and a rotary disk horizontally mounted to a lower end of the rotation shaft for rotation therewith and placed under the propeller assembly, the rotary disk being coupled with the flow adjustment plate to close a lower end opening of the adjustment plate and being rotatable relative to the flow adjustment plate. In the treatment apparatus, the inorganic balls and garbage stored in the container are agitated by the propeller assembly during rotation of the rotation shaft and moved downward at the central portion of the container to flow upward along the flow adjustment plate and the inner peripheral wall of the container.

10 Claims, 2 Drawing Sheets

GARBAGE TREATMENT APPARATUS

BACKGROUND OF THE INVENTION

1. Field of the Invention

The present invention relates to a garbage treatment apparatus, and more particularly to a garbage treatment apparatus of the type in which porous inorganic balls containing microorganism are used to decompose garbage into sludge and gases.

2. Description of the Prior Art

In recent years, there has been proposed a treatment method of garbage in which an amount of sintered porous inorganic balls (in the form of porous ceramic balls of about 5–12 mm in diameter) containing microorganism effective for decomposition of garbage is stored in a treatment container and mixed with garbage put into the treatment container so that the garbage is fermented by the microorganism and decomposed into sludge and gases. In such a treatment method, the garbage is crushed by the inorganic balls into fine particles and decomposed in a short time by ferment caused by the microorganism.

As a method of mixing the garbage with the porous inorganic balls, there have been proposed a method of agitating the garbage and inorganic balls by means of agitating blades rotated in a vertical direction within a treatment container and a method of mixing the inorganic balls and garbage by vibration in a treatment container. In the former method, the garbage can be crushed by the agitating blades into fine particles to enhance mixing efficiency with the inorganic balls. However, a large driving force is required to rotate the agitating blades against a resistance caused by the garbage, and there will occur unpleasant noises during rotation of the agitating blades. In the former method, it is also required to rotate the agitating blades at a position near the inner peripheral wall of the container for sufficient agitation of the inorganic balls. In this instance, the inorganic balls are crushed by the agitating blades if brought into a space between the inner peripheral wall of the container and distal ends of the agitating blades. If the inorganic balls were crushed into fine particles, the property of the microorganism would be deteriorated. For this reason, it is required to frequently replenish fresh inorganic balls in the treatment container.

In the latter method described above, it takes a long time for treatment of the garbage since the vibration of the container does not effect to sufficiently mix the garbage with the inorganic balls and to crush the garbage into fine particles in addition, if the vibration of the container causes the garbage and inorganic balls to lump at the bottom of the container, it is required to remove a lump of garbage and inorganic balls from the container.

Additionally, in both the treatment methods, residual sludge of the garbage is adhered to the inorganic balls and remains in the container after treatment of the garbage. If left in the container for a long time, the residual sludge of garbage will harden on the inorganic balls. This deteriorates the decomposition property of the inorganic balls and occurs bad smell. To avoid such a problem, it is required to frequently wash the inorganic balls and the interior of the container in a clean condition.

SUMMARY OF THE INVENTION

It is, therefore, a primary object of the present invention to provide a garbage treatment apparatus wherein the garbage and inorganic balls are uniformly mixed without causing crush of the inorganic balls during treatment of the garbage, and wherein residual sludge adhered to the inorganic balls can be removed by washing in a simple manner after treatment of the garbage.

According to the present invention, the object is attained by providing a garbage treatment apparatus of the type which includes a cylindrical container formed to store an amount of porous inorganic balls containing microorganism effective for decomposition of garbage and to store an amount of garbage to be treated, a rotation shaft vertically mounted for rotary movement in a central portion of the container; a driving mechanism mounted on the container for driving the rotation shaft a screw propeller assembly mounted to a lower portion of the rotation shaft for rotation therewith to feed downward the inorganic balls and garbage stored in the container a flow adjustment plate in the form of a truncated conical plate mounted within a bottom portion of the container concentrically with the rotation shaft and placed in an upwardly expanded condition, and a rotary disk horizontally mounted to a lower end of the rotation shaft for rotation therewith and placed under the propeller assembly, the rotary disk being coupled with the flow adjustment plate to close a lower end opening of the adjustment plate and being rotatable relative to the flow adjustment plate, wherein the inorganic balls and garbage stored in the container are agitated by the propeller assembly during rotation of the rotation shaft and moved downward at the central portion of the container to flow upward along the flow adjustment plate and the inner peripheral wall of the container.

According to an aspect of the present invention, an annular space is formed between an upper end periphery of the flow adjustment plate and the inner periphery wall of the container to discharge therethrough, residual sludge of the garbage decomposed by microorganism in the inorganic balls, and a discharge hole is formed in a bottom plate of the container to discharge therethrough the residual sludge from the annular space.

In a practical embodiment of the present invention, it is preferable that a shower nozzle is provided within an upper portion of the container to be supplied with fresh water from an external water source for washing out residual sludge adhered to the inorganic balls and the interior of the container during rotation of the rotation shaft. It is also preferable that a second flow adjustment plate in the form of a truncated conical plate is mounted to the inner peripheral wall of the container to cover the annular space between the upper end periphery of the first-named flow adjustment plate and the inner peripheral wall of the container, wherein the second flow adjustment plate is spaced at its lower end from the upper end periphery of the first-named flow adjustment plate to discharge the residual sludge of garbage.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
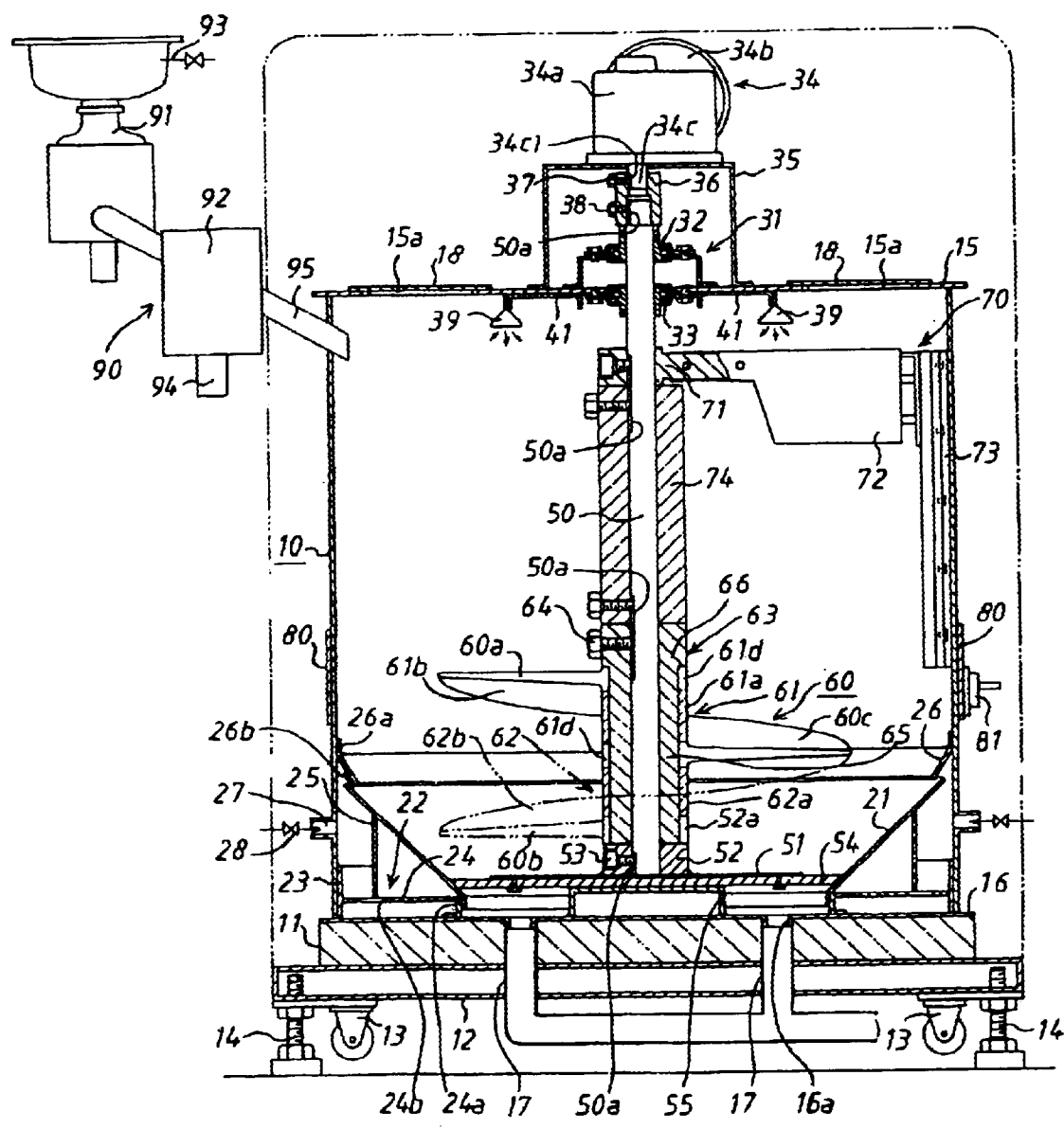
FIG. 1 is a vertical sectional view illustrating an internal construction of a garbage treatment apparatus in accordance with the present invention.
Figure 2:
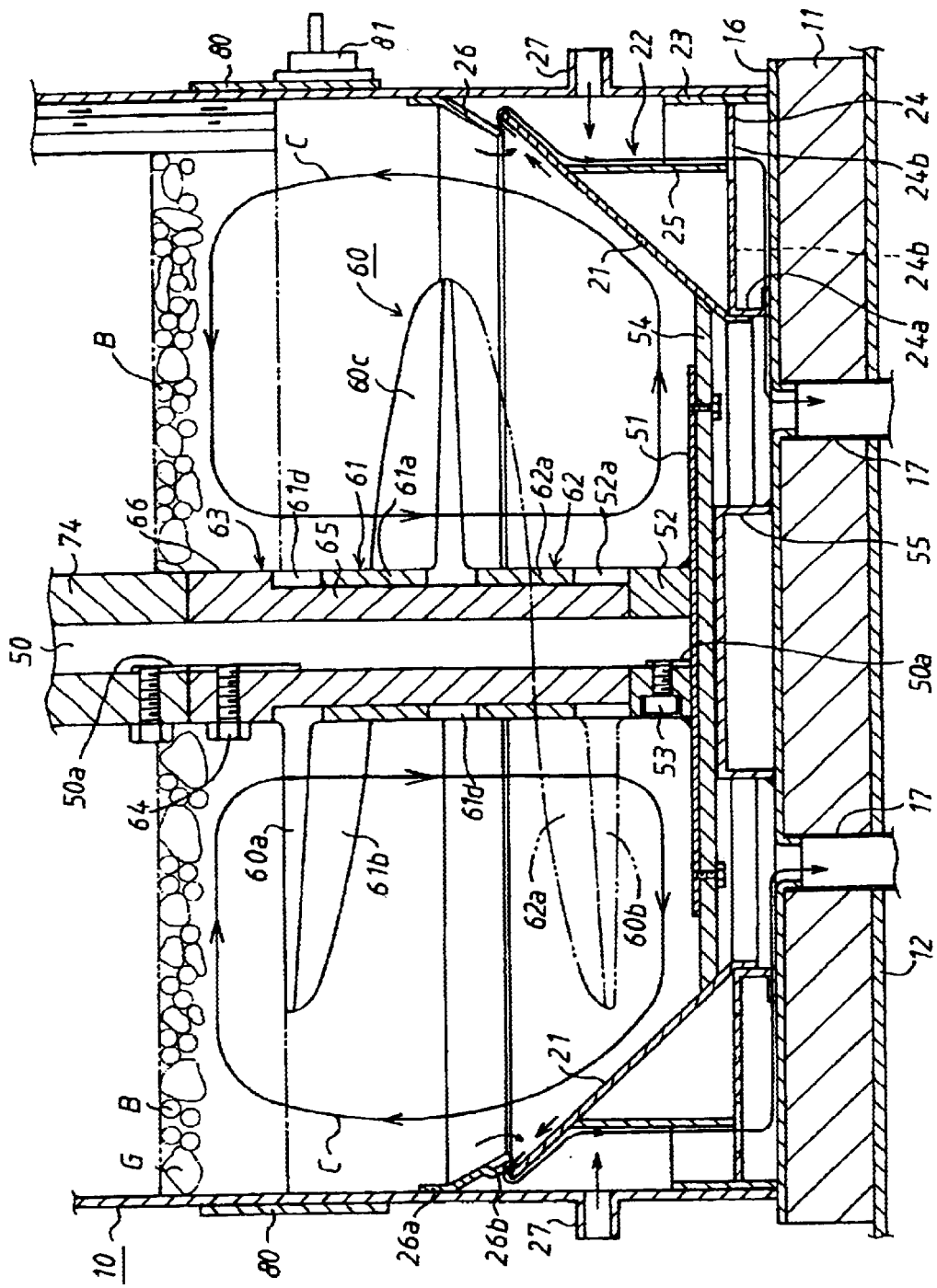
FIG. 2 is an enlarged vertical sectional view illustrating treatment mode and washing mode of the garbage treatment apparatus.

Illustrated in FIGS. 1 and 2 of the drawings is an embodiment of a garbage treatment apparatus in accordance with the present invention FIG. 1 illustrates an internal construction of the garbage treatment apparatus in vertical section, and FIG. 2 illustrates treatment mode and washing mode of the garbage treatment apparatus in enlarged vertical section.

The garbage treatment apparatus has a metallic cylindrical container 10 made of stainless steel mounted on a base plate 11 which is positioned in place on a wheeled base plate 12. The wheeled base plate 12 is provided at its bottom with, casters 13 and support legs 14. The casters 13 are useful to move the garbage treatment apparatus for placing it at a desired position, and the support legs 14 are adjustable to support the garbage treatment apparatus at a desired height in place.

The cylindrical container 10 is formed to store an amount of garbage G to be treated and to store an amount of porous inorganic balls B containing microorganism effective for decomposition of the garbage. In a practical embodiment of the present invention, the cylindrical container 10 may be provided in the form of a container of polygon such as square or hexagon in cross-section. In use of the garbage treatment apparatus, it is desirable that the stored amount of the porous inorganic balls B is adjusted to be about three times the amount of garbage G. The porous inorganic ball B contains, for example, liquefied bacteria effective for decomposing solid bodies of the garbage into low molecular organic substances such as low-grade fatty acid, ketone, alcohol, etc., bacteria effective for decomposing liquefied substances into carbon dioxide, methane gas, etc., and soil bacteria effective for amine-decomposition of a bad smell caused by decomposition of high protein such as meat, fish or the like.

The cylindrical container 10 is closed by upper and bottom plates 15 and 16 secured to its upper and lower ends in a liquid-tight manner. The bottom plate 16 is formed with discharge openings 16a in connection to discharge pipes 17 extended in a vertical direction through the base plates 11 and 12 to discharge residual substances such as water, leftovers or the like of garbage treated by reaction with the microorganism of porous inorganic balls B to the exterior of the treatment device. Mounted within a lower portion of the cylindrical container 10 is a first flow adjustment plate 21 in the form of a truncated conical plate made of stainless steel which is placed concentrically with a rotation shaft 50 and expanded upward to cause upward movement of the garbage and inorganic balls received thereon. The first flow adjustment plate 21 has an inner peripheral surface inclined at a predetermined angle (for example, 45 degrees) relative to a horizontal plane and is arranged to form an annular space between the upper end periphery of flow adjustment plate 21 and an inter peripheral wall of the cylindrical container 10.

The first flow adjustment plate 21 is mounted in place by means of a mounting assembly 22 composed of an outer cylindrical plate 23, an annular flat plate 24 and an inner cylindrical plate 25. The outer cylindrical plate 23 is coupled with the inner peripheral wall of the cylindrical container 10 and fixed in place by screws. The annular flat plate 24 is welded at its outer periphery to an inner periphery of outer cylindrical plate 23 and at its inner periphery to an outer periphery of the lower opening portion of flow adjustment plate 21. The annular flat plate 24 is formed at its inner periphery with a plurality of circumferentially spaced support legs 24a for support of the flow adjustment plate 21 and is formed at its support legs 24a with a plurality of apertures 24b. The inner cylindrical plate 25 is welded at its lower end to the upper surface of annular flat plate 24 and at its upper end to the outer periphery of an intermediate portion of the flow adjustment plate 21.

Mounted within the lower portion of cylindrical container 21 is a second flow adjustment plate 26 in the form of a truncated conical plate made of metal such as stainless steel which is placed concentrically with the first flow adjustment plate 21 to cover an annular space between the upper end periphery of first flow adjustment plate 21 and the inner peripheral wall of cylindrical container 10 and is expanded upward. The second flow adjustment plate 26 has an inner peripheral surface inclined at a predetermined angle (for example, 60 degrees). The second flow adjustment plate 26 is formed at it upper end periphery with an annular flange 26a which is coupled with the inner peripheral wall of cylindrical container 21 in a liquid-tight manner. The second flow adjustment plate 26 is formed at its lower end periphery with a plurality of circumferentially equally spaced projections 26b of predetermined height (for example, 2 mm in height) which are retained in engagement with the upper end periphery of first flow adjustment plate 21 to form a plurality of circumferentially equally spaced openings between the lower end periphery of second flow adjustment plate 26 and the upper end periphery of first flow adjustment plate 21. The spaced openings are formed smaller in size than the porous inorganic balls B.

At the lower portion of cylindrical container 10, a pair of diametrically opposed water supply nozzles 27 are mounted to the peripheral wall of container 10 to supply diluted water into an annular space formed under the first flow adjustment plate 21. The water supply nozzles 27 each are provided with an electromagnetic valve 28 which is energized to supply the dilute water into the annular space and deenergized to block the supply of the diluted water.

Mounted on a central portion of the upper plate 15 of cylindrical container 10 is a journal assembly 31 composed of a pair of vertically spaced bearings 32 and 33 for supporting an upper portion of the rotation shaft 50 extended upward through the upperplate 15. A drive mechanism 34 is mounted on the upper plate 15 of container 10 through a support stand 35 to drive the rotation shaft 50. The support stand 35 is formed to contain the journal assembly 31. The drive mechanism 34 is composed of a change-speed mechanism 34a and an electric motor 34b mounted on the support stand 35. In this embodiment the drive mechanism 34 is adjusted to rotate the rotation shaft 50 at a speed of 5 r.p.m. to 6 r.p.m. An output shaft 34c of the drive mechanism 34 is coaxially connected to the upper end of rotation shaft 50 by means of a cylindrical member 36. The cylindrical member 36 is coupled at its upper portion with the output shaft 34c and at its lower portion with the upper end of rotation shaft 50 Screws 37, 38 are threaded into the cylindrical member 36 and engaged with axial grooves 34c1, 50a respectively formed on the output shaft 34c and the rotation shaft 50.

The upper plate 15 is formed with openings 15a for entry of the porous inorganic balls B into the container 10. The openings 15a are closed in an air-tight manner by means of lids 18 hinged to the upper plate 15. Shower nozzles 39 are mounted within an upper portion of the cylindrical container 10 for washing the interior of container 10 with fresh water supplied from an external source of water (not shown). The shower nozzles 39 each are assembled with an annular reinforcement member 41 fixed to the upper plate 15 of container 10.

The rotation shaft 50 is vertically arranged in a central portion of container 10 and is assembled at its lower end with a first rotary disk 51 of stainless steel The lower end of rotation shaft 50 is coupled with a cylindrical portion 52 integrally formed on the first rotary disk 51 and is fixed in place by means of a screw 53 threaded into the cylindrical portion 52 and engaged with an axial groove 50a formed on the rotation shaft 50. In such a manner as described above, the rotation shaft 50 is mounted on the first rotary disk 51 for rotation therewith.

The first rotary disk 51 is mounted on a second rotary disk 54 of synthetic resin of high strength such as polyacetal and fixed to the second rotary disk 54 by screws for rotation therewith. The second rotary disk 54 is horizontally placed to close the lower end opening of the flow adjustment plate 21 and to rotate with the rotation shaft 50 relatively to the first flow adjustment plate 21. The second rotary disk 54 is retained at its outer periphery in slide contact with the inner peripheral surface of the first flow adjustment plate 21. Provided under the second rotary disk 54 is a rectangular disk receiver 55 which is welded to the bottom plate 16 and spaced in a slight distance from the bottom of second rotary disk 54 when the second rotary disk 54 is deflected downward due to the weight of garbage stored in the container 10, the second rotary disk 54 is rotatably supported on the disk receiver 55.

A screw propeller assembly 60 is mounted to the lower portion of rotation shaft 50 for rotation therewith. The screw propeller assembly 60 is composed of a pair of upper and lower propellers 61 and 62. The upper propeller 61 is composed of a pair of vertically spaced blades 60a which are integrally formed with a cylindrical body 61a and a spiral agitating portion 61b Similarly, the lower propeller 62 is composed of a pair of vertically spaced blades 60b which are integrally formed with a cylindrical body 62a and a spiral agitating portion 62b.

A hollow mounting shaft 63 is coupled within the cylindrical bodies 61a, 62a of propellers 60, 62, and the rotation shaft 50 is inserted into an axial bore of mounting shaft 63. The mounting shaft 63 is assembled with the rotation shaft 50 and fixed to the rotation shaft 50 by means of a screw 64 threaded into the mounting shaft 63 and engaged with an axial groove 50a formed on the rotation shaft 50. The mount shaft 63 has a support portion 65 coupled with the cylindrical bodies 61a, 62a of propellers 61, 62 and a head portion 66 lager in diameter than the support portion 65 The head portion 66 of mounting shaft 63 is formed at its lower end periphery with a semi-circular recess for engagement with a projection 61d formed on an upper end of the cylindrical body 61a of upper propeller 61. The upper cylindrical body 61a is formed at its lower end with a recess for engagement with a projection formed on an upper end of the cylindrical body 62a of lower propeller 62. The lower cylindrical body 62a is formed at its lower end with a recess for engagement with a projection 52a formed on the cylindrical portion 52 of first rotary disk 51. With such a mounting construction as described above, the propeller assembly 60 is mounted to the lower portion of rotation shaft 50 for rotation therewith and spaced from the first rotary disk 51 in a distance larger than the diameter of porous inorganic ball B. In operation of the drive mechanism 34, the propeller assembly 60 is rotated with the rotation shaft 50 in a direction for feeding downward the garbage and inorganic balls stored in a central portion of the container 10.

A wiper assembly 70 is mounted to the upper portion of rotation shaft 50 to wipe off residual substances adhered to the inner peripheral wall of container 10. The wiper assembly 70 is composed of a mounting portion 71, an arm portion 72 and a wiper portion 73. The mounting portion 71 is supported on a hollow support shaft 74 and fixed to the rotation shaft 50 by means of a screw threaded therein The arm portion 72 is radially extended from the mounting portion 71, and the wiper portion 73 is connected to an outer end of the mounting portion 71 in a vertical direction. The lower end of wiper portion 73 is located approximately at the same height as that of an upper end of the propeller assembly 60. The support shaft 74 is coaxially assembled with the rotation shaft 50 and fixed to the rotation shaft 50 by means of screws threaded therein A heater 80 in the form of an annular plate is mounted to an outer peripheral wall of container 10 to warm up the interior of container 10, and a temperature sensor 81 is mounted on the heater 80 to detect an inside temperature of container 10. The heater 80 is activated under control of an electric controller (not shown) in such a manner that the inside temperature of container 10 is maintained at an optimum temperature (for instance, 5° C.–50° C.) suitable for decomposition of garbage caused by microorganism in the porous inorganic balls.

A disposal device 90 placed in a sink of a kitchen is assembled with an upper portion of the outer peripheral wall of container 10. The disposal device 90 is composed of a crusher 91 and a dehydrator 92. The crusher 91 is provided to crush garbage put in its interior and to discharge crushed garbage with fresh water supplied from a water supply conduit 93 into the dehydrator 92. The dehydrator 92 is provided to separate the crashed garbage from the water thereby to discharge the water into a drainpipe 94 and to discharge the crushed and dehydrated garbage into the container 10 through a feed pipe 95.

In use of the garbage treatment apparatus, as shown in FIG. 2, the crushed and dehydrated garbage G is put into the treatment container 10 from the disposal device 90 in a condition where an amount of porous inorganic balls B containing microorganism effective for decomposition of garbage has been stored in the container 10. When a start switch (not shown) of the apparatus is closed to operate the driving electric motor 34b, the rotation shaft 50 is rotated with the output shaft 34c of motor 34b to rotate the propeller assembly 60 and first and second rotary disks 51 and 52 therewith.

During such operation, the porous inorganic balls B and garbage G stored at the central portion of container 10 are moved by rotation of the propeller assembly 60 toward the bottom of container 10, and the downward movement of inorganic balls B and garbage G causes the porous inorganic balls B and garbage G stored in the bottom of container 10 to move upward along the first and second flow adjustment plates 21 and 26 and the inner periphery wall of container 10. Meanwhile, the porous inorganic balls B and garbage G stored in an upper portion of container 10 are drawn by rotation of the propeller assembly 60 into the central portion of container 10. Thus, the porous inorganic balls B and garbage G are circulated and uniformly mixed so that the garbage G is crushed by the inorganic balls B and fermented by microorganism contained in the inorganic balls B. As a result, the garbage is decomposed by ferment caused by the microorganism and separated into sludge and gases.

In progress of the decomposition treatment, the garbage becomes sludge and is mixed with the inorganic balls B in the container 10. In such a condition, the residual sludge of garbage is moved by rotation of the second rotary disk 54 toward the first flow adjustment plate 21 and adhered to the porous inorganic balls B passing along the annular space between the upper end periphery of first adjustment plate 21 and the lower end periphery of second flow adjustment plate 26. This is useful to prevent the sludge of garbage from clogging the annular space between the first and second flow adjustment plates 21 and 26. Thus, as shown by arrows in FIG 2, a the sludge caused by treatment of the garbage is discharged through the annular space between the first and second flow adjustment plates 21 and 26, the apertures 24b of annular flat plate 24 and discharge holes 16a. During rotation of the rotation shaft 50, smooth movement of the porous inorganic balls B is effected without causing any block in each space among the propeller assembly 60 and the flow adjustment plates 21, 26 and between the second rotary disk 54 and first flow adjustment plate 21.

After finish of decomposition treatment of the garbage, the shower nozzles 39 are supplied with clean water during rotation of the rotation shaft 50 to wash out the residual sludge of garbage adhered to the porous inorganic balls B, first and second flow adjustment plates 21 and 26 and the inner periphery wall of container 10. At this stage, the residual sludge of garbage is discharged with the washing water through the annular space between the first flow adjustment plate 21 and the inner peripheral wall of container 10 and the discharge conduits 17 so that the porous inorganic balls B are retained in a clean condition in the treatment container 20. Thus, a bad smell caused by decomposition of the garbage is eliminated by washing of the interior of cabinet 10, and the decomposition properties of microorganism contained in the inorganic balls B are maintained in a high value for treatment of garbage newly put into the container 10. In addition, the washing water discharged from the interior of container 10 is diluted by fresh water supplied from the water supply nozzles 27 into spaces under the first flow adjustment plate 21 and is discharged in a diluted condition from the discharge conduits 17.

In a practical embodiment of the present invention, it is desirable that a purifier is provided to eliminate precipitate of washing water mixed with the treated residual sludge of garbage thereby to discharge the washing water in a clean condition. In this instance, the precipitate in the form of fine particles of garbage can be utilized as fertilizer by drying.

What is claimed is:

1. A garbage treatment apparatus comprising:
    a cylindrical container formed to store an amount of porous inorganic balls containing microorganism effective for decomposition of garbage and to store an amount of garbage to be treated;
    a rotation shaft vertically mounted for rotary movement in a central portion of the container;
    a driving mechanism mounted on the container for driving the rotation shaft;
    a screw propeller assembly mounted to a lower portion of the rotation shaft for rotation therewith to feed downward the inorganic balls and garbage stored in the container;
    a flow adjustment plate in the form of a truncated conical plate mounted within a bottom portion of the container concentrically with the rotation shaft and placed in an upwardly expanded condition; and
    a rotary disk horizontally mounted to a lower end of the rotation shaft for rotation therewith and placed under the propeller assembly, the rotary disk being coupled with the flow adjustment plate to close a lower end opening of the adjustment plate and being rotatable relative to the flow adjustment plate;
    wherein the inorganic balls and garbage stored in the container are agitated by the propeller assembly during rotation of the rotation shaft and moved downward at the central portion of the container to flow upward along the flow adjustment plate and the inner peripheral wall of the container.

2. A garbage treatment apparatus as claimed in claim 1, wherein an annular space is formed between an upper end periphery of the flow adjustment plate and the inner periphery wall of the container to discharge therethrough residual sludge of the garbage decomposed by microorganism in the inorganic balls, and wherein a discharge hole is formed in a bottom plate of the container to discharge therethrough the residual sludge from the annular space.

3. A garbage treatment apparatus as claimed in claim 2, wherein a shower nozzle is provided within an upper portion of the container to be supplied with fresh water from an external water source for washing out residual sludge adhered to the inorganic balls and the interior of the container during rotation of the rotation shaft.

4. A garbage treatment apparatus as claimed in claim 3 wherein a water supply nozzle is mounted to a lower peripheral wall of the container to supply fresh water into a space formed under the first-named flow adjustment plate thereby to dilute the washing water discharged from the annular space between the first-named flow adjustment plate and the inner peripheral wall of the container.

5. A garbage treatment apparatus as claimed in claim 2, wherein a second flow adjustment plate in the form of a truncated conical plate is mounted to the inner peripheral wall of the container to cover the annular space between the upper end periphery of the first-named flow adjustment plate and the inner peripheral wall of the container, and wherein the second flow adjustment plate is spaced at its lower end from the upper end periphery of the first-named flow adjustment plate to discharge the residual sludge of garbage.

6. A garbage treatment apparatus as claimed in claim 1, wherein a wiper assembly is mounted to an upper portion of the rotation shaft to wipe off residual sludge of the garbage adhered to the inner peripheral wall of the container during rotation of the rotation shaft.

7. A garbage treatment apparatus as claimed in claim 1, wherein the screw propeller assembly is composed of a pair of vertically spaced radial blades and a spiral agitating portion integrally formed with the radial blades.

8. A garbage treatment apparatus as claimed in claim 1, wherein the drive mechanism is mounted on an upper plate of the container and placed coaxially in drive connection with an upper end of the rotation shaft.

9. A garbage treatment apparatus as claimed in claim 1, wherein a heater is mounted to an outer peripheral wall of the container to warm the garbage and inorganic balls stored in the container.

10. A garbage treatment apparatus as claimed in claim 1, wherein a disposal device is assembled with an upper portion of the container to crush and dehydrate garbage put into the container.

* * * * *